(12) United States Patent
Zhang

(10) Patent No.: US 8,529,303 B2
(45) Date of Patent: Sep. 10, 2013

(54) SPRING CONTACT FOR CONDUCTING ELECTRICITY

(75) Inventor: Zhengzhou Zhang, Xi'an (CN)

(73) Assignee: Shaanxi Victory Electric Co., Ltd., Xi'an (CN)

( * ) Notice: Subject to any disclaimer, the term of this patent is extended or adjusted under 35 U.S.C. 154(b) by 165 days.

(21) Appl. No.: 13/062,489

(22) PCT Filed: May 25, 2010

(86) PCT No.: PCT/CN2010/073189
§ 371 (c)(1),
(2), (4) Date: Jun. 23, 2011

(87) PCT Pub. No.: WO2011/072511
PCT Pub. Date: Jun. 23, 2011

(65) Prior Publication Data
US 2011/0281475 A1   Nov. 17, 2011

(30) Foreign Application Priority Data

Dec. 18, 2009   (CN) .......................... 2009 1 0219563

(51) Int. Cl.
*H01R 13/33* (2006.01)
(52) U.S. Cl.
USPC ........................................ 439/840
(58) Field of Classification Search
USPC ................................. 439/840, 841
See application file for complete search history.

(56) References Cited

U.S. PATENT DOCUMENTS

| | | | | |
|---|---|---|---|---|
| 1,800,254 A | * | 4/1931 | Holmes | 16/421 |
| 2,444,433 A | * | 7/1948 | Erb | 439/841 |
| 2,584,528 A | * | 2/1952 | Alexander | 439/739 |
| 3,210,722 A | * | 10/1965 | Johns | 439/840 |
| 5,059,143 A | * | 10/1991 | Grabbe | 439/886 |

(Continued)

FOREIGN PATENT DOCUMENTS

| | | |
|---|---|---|
| CN | 201054472 Y | 4/2008 |
| CN | 201237994 Y | 5/2009 |

(Continued)

OTHER PUBLICATIONS

Chinese Office Action regarding Application No. 200910219563.9, issued Apr. 19, 2011. Translation provided by Dragon Intellectual Property Law Firm.

(Continued)

*Primary Examiner* — Gary F. Paumen
(74) *Attorney, Agent, or Firm* — Harness, Dickey & Pierce, P.L.C.

(57) ABSTRACT

The present invention provides a spring contact for conducting electricity, Among two side edges for conducting electricity at a cross section of each ring of the spring contact, wherein one side edge for conducting electricity has two or more contacting points, while the other side edge for conducting electricity having at least one contacting point, or a contacting line. Because at each ring cross section of the spring contact, two or more than two contacting points are secured on any side edge for conducting electricity, aim of duplicated current passing capacity is obtained. The shape of each ring cross section is changed from annular shape to other shapes whose cross section area is smaller than that of the annular shape. Therefore, the spring contact of present invention which satisfying the requirements for miniaturizing, saves materials and reduces working space occupied during its installing.

12 Claims, 9 Drawing Sheets

(56) References Cited

U.S. PATENT DOCUMENTS

| | | | |
|---|---|---|---|
| 7,074,096 B2 * | 7/2006 | Copper et al. | 439/843 |
| 7,274,964 B2 * | 9/2007 | Balsells | 607/37 |
| 7,914,351 B2 * | 3/2011 | Balsells et al. | 439/840 |
| 8,057,270 B2 | 11/2011 | Shimazu et al. | |
| 2003/0157846 A1 | 8/2003 | Poon et al. | |

FOREIGN PATENT DOCUMENTS

| | | |
|---|---|---|
| DE | 10200402404 | 9/2005 |
| JP | 53039267 U | 4/1978 |
| JP | 11-329128 A | 11/1999 |
| JP | 2008204634 A | 9/2008 |
| WO | WO-2009072263 A1 | 6/2009 |

OTHER PUBLICATIONS

Japanese Notification of Reasons for Refusal regarding Application No. 2011-549428, dated Jan. 21, 2013. Translation provided by Dragon Intellectual Property Law Firm.

* cited by examiner

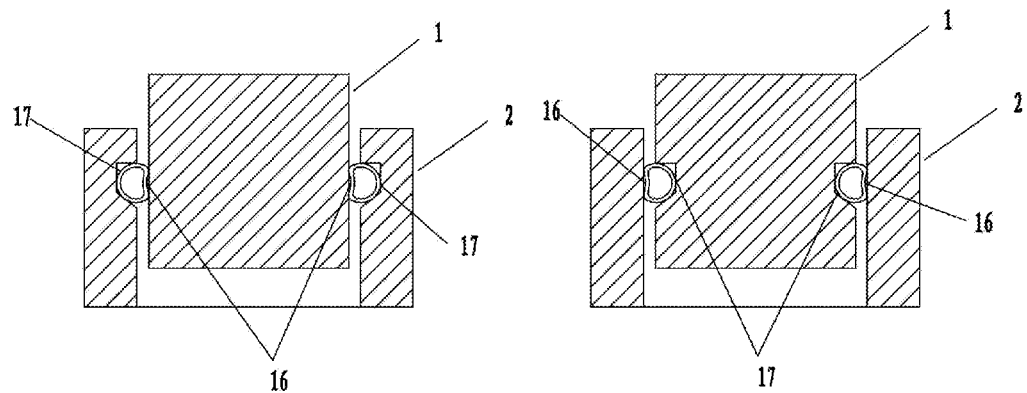
Fig. 9 ( d )   Fig. 9 ( e )
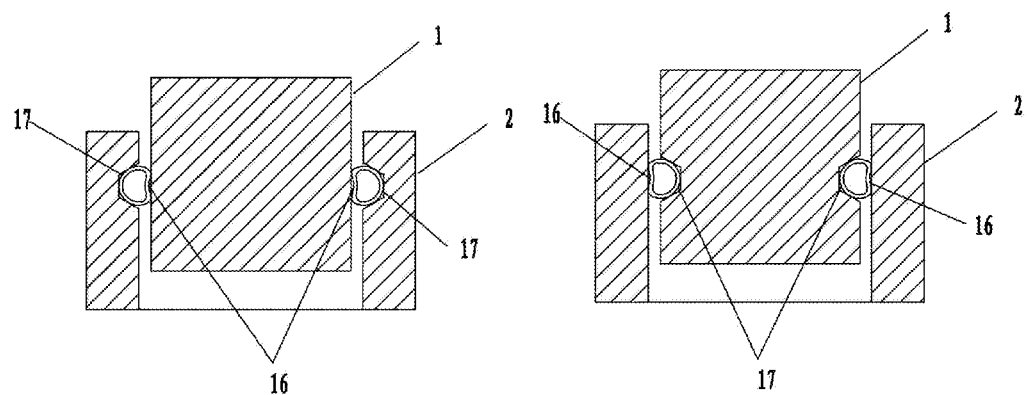
Fig. 9 ( f )   Fig. 9 ( g )

SPRING CONTACT FOR CONDUCTING ELECTRICITY

FIELD OF THE INVENTION

The present invention relates to an electrical connector, and more particularly, relates to a spring contact for conducting electricity.

BACKGROUND OF THE INVENTION

Presently, spring contacts are applied in electricity system and high voltage switch fields, and mostly are applied in transmission and transformation lines for electrical connecting. There are various types of specific configurations for point contacts in electricity systems and high voltage switch facilities. Based on whether there are relative movements in point contact portion during operating, such configurations can be divided into three main types: sliding connecting, static connecting and plug-in connecting. In sliding connecting, a movable contact can slidably move with respect to a static contact, but they do not separated from each other. In static connecting, during working period, a movable contact and a static contact immovably contact together, while not moving with respect to each other and separating from each other, two or more conductor connecting portions of which are fixed by fastener pressing mechanical method, for example, such as bolts, threads, or rivets and so on. In plug-in connecting, a movable contact and a static contact can be separated from each other or come into contact together at any time. Such connecting is typically used for connecting or shutting off circuits in idle load, normal load or short circuit conditions. Above-mentioned three connecting types typically include several portions, i.e. conducting circuits, which are loaded with electrical current; separable contacts, on which spring contacts are installed; arc-control devices, which allow for extinguishing arc quickly so that circuits are finally cutout, however, generally speaking, are not provided for a high voltage isolating switch dedicatedly; driving mechanisms; operating mechanisms and so on. It is noted that, and when a high voltage switch are properly at ON position, sufficient contact pressure to the contact head is only depended on pressing or pulling actions of the spring contact.

Currently, one type configuration for a plug-in high voltage switch contact, as is shown in FIG. 1, is widely used, which includes a static contact 100, a movable contact 101, and a spring contact 102. The spring contact 102 is generally positioned in an annular groove of a static contact 100 (rarely is set in a groove of a movable contact). The movable contact 101 can move up and down in the static contact 100 until it falling off from the static contact 100. Such configuration is based on a principle as follows: a movable contact 101 comes into tight contact with a static contact 100 at point A and B through elastic deformation of the spring contact 102, and point C is only used to define position of the spring contact 102, without undertaking contacting pressure. Thus, current is allowed to flow from point A to point B of the spring contact 102, so that current circulation is achieved. The spring contact is a critical factor for such configuration, so that it is required to process good elastic property and reasonable configuration, so as to secure stable contact, uniform current and reasonable temperature rising property. Sliding connecting and static connecting are based on the same principle as above.

However, there are several disadvantages in prior spring contacts:

1. From FIG. 1(a), it can be seen that a spring contact comes into contact with a movable contact and a static contact respectively only at one point, and only one half arc passes each point, as a result, there is a limit of current passing capacity;
2. The single ring cross section of the spring contact is circular, which takes up more space;
3. The groove for installing is not reasonable, because its path for current passing is longer, and resistance at a single point is bigger, which is not an optimized mode;
4. Its current passing capacity is limited, circular cross section area is bigger, and configuration for installing is not reasonable, which cannot satisfy requirements for a compact and simple spring contact, as a result, prior spring contacts are only applied in high voltage switch field.

SUMMARY OF THE INVENTION

To resolve the technical problems existing in prior art, the present invention provides a spring contact for conducting electricity, wherein, among two contacting side edges for conducting electricity at a cross section of each ring of the spring contact, any contacting side edge for conducting electricity are secured with two or more contacting points, so that an aim of duplicated current passing capacity is obtained.

The technical solution of the present invention is to provide a spring contact for conducting electricity, wherein: among two contacting side edges for conducting electricity at a cross section of each ring of the spring contact, and one contacting side edge for conducting electricity has two or more contacting points, while the other contacting side edge for conducting electricity having at least one contacting point, or a contacting line.

In the spring contact, one of the contacting side edges for conducting electricity at a cross section of each ring of the spring contact has two or three contacting points, and the other contacting side edge for conducting electricity has one or two contacting points.

In the spring contact, the contacting side edges for conducting electricity at the cross section are of arc, folded lines or wave line shapes.

In the spring contact, one of the contacting side edges for conducting electricity at the cross section is of inner arc shape, while the other is of inner arc, outer arc or straight line shapes.

In the spring contact, the spring contact for conducting electricity is configured as a closed coil spring having a circular shape.

The invention also provides a connector including a spring contact, which comprises a first conductor, a second conductor, a spring contact for electrically connecting the first conductor and the second conductor and being positioned in a groove in the first conductor or the second conductor, wherein: among two contacting side edges for conducting electricity at a cross section of each ring of the spring contact, and one contacting side edge for conducting electricity has two or more contacting points, while the other contacting side edge for conducting electricity having at least one contacting point, or a contacting line.

In the connector, the groove is of rectangle, right trapezoid, trapezoid, semi hexagonal or notched rectangle shapes.

In the connector, the contacting side edges for conducting electricity in the cross section are of arc, folded lines or wave line shapes.

In the connector, wherein one of the contacting side edges for conducting electricity at the cross section is of inner arc shape, while the other is of inner arc, outer arc or straight line shapes.

In the connector, the spring contact for conducting electricity is configured as a closed coil spring having a circular shape.

Advantages of the present invention are as follows:

1. Compared with a prior spring contact which provides two contacting points and a single circulating path, the spring contact according to the present invention provides four contacting points and two shorter circulating paths; as a result, with the duplicated over-current area, provides for a significantly increased current passing capacity, which is increased more than one time.

2. Shape of each ring cross section of the present spring contact is changed from annular shape to other shapes whose cross section area is smaller than that of the annular shape. As a result, saving of material and reducing of working space occupied during installing which satisfying requirements for miniaturizing, can be achieved.

3. In the connector including the spring contact according to the present invention, a groove on a first conductor or a second conductor used for installing a spring contact can be of right trapezoid, trapezoid, semi hexagonal or notched rectangle shapes based on original rectangle shape as well. Therefore, such connectors allow for more optimized assembling solutions which can shorten current passing path, reduce line resistance so as to improve conducting properties of the connector.

4. Based on duplicated conducting properties, reduced working space, the spring contact according to the present invention can be widely applied in connectors of various fields that require high current-carrying capacity and smaller assembling space.

DETAILED DESCRIPTION

Figure 1:
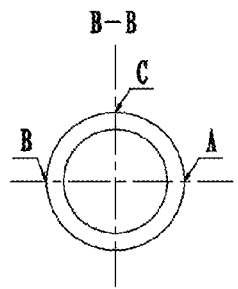
FIG. 1(a) is a scheme of prior spring contact.
FIG. 1(b) is a scheme showing contacting modes between a prior spring contact and a static contact or a movable contact.
Figure 1:
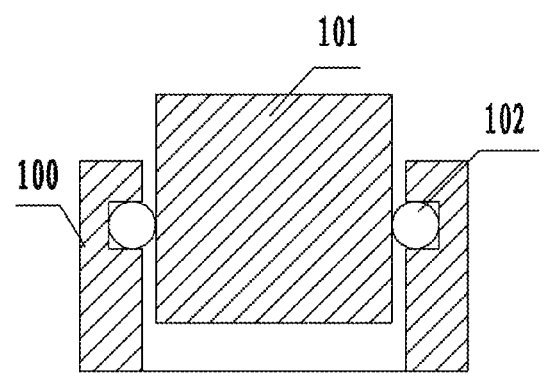
Figure 2:
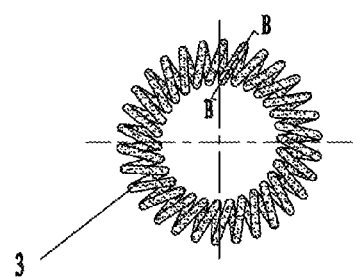
FIG. 2 is a scheme of a spring contact according to present invention.

Referring to FIG. 2, it shows that the spring contact according to the present invention is shaped into a closed coil spring having a circular shape as a whole.

Figure 3:
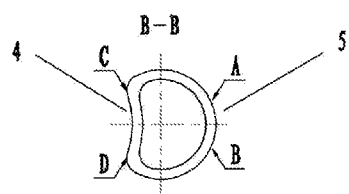
FIG. 3(a) is a cross section view taking along line B-B of a spring contact according to embodiment 1 of the present invention.
FIG. 3(b) is a scheme showing a contact mode between a first conductor or a second conductor and a spring contact according to embodiment 1 of the present invention.
FIG. 3(c) is a scheme showing another kind of contact mode between a first conductor or a second conductor and a spring contact according to embodiment 2 of the present invention.
Figure 3:
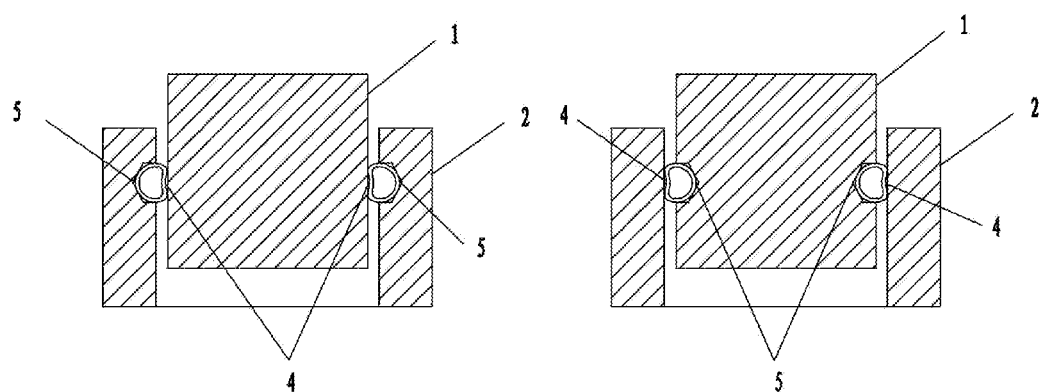

Referring to FIGS. 3(a)-3(c), they show embodiment 1 of the present invention from various aspects. Referring to FIG. 3(a), it can be seen that in a cross section 3 of a spring contact, there are two contacting side edges contacting with conductors, namely, a contacting side edge 4 which is an inner arc, and a contacting side edge 5 which is a outer arc. Referring to FIG. 3(*b*), it can be seen that the spring contact 3 contacts with a conductor 1 via the contacting side edge 4, obtaining two-point contact, namely, point C and point D. A semi hexagonal groove is selected to be used in conductor 2, with the contacting side edge 5 of the spring contact 3 contacting with the conductor 2 at point A and point B. Therefore, electrical current flows from A to C, from B to D, obtaining bidirectional circulating. Referring to 3(*c*), a semi hexagonal groove is selected to be used in conductor 1, with the contacting side edge 5 of the spring contact 3 contacting with the conductor 1 at point A and point B, the contacting side edge 4 of the spring contact 3 contacting with the conductor 2 at point C and point D. Therefore, electrical current flows from A to C, from B to D, obtaining bidirectional circulating.

Figure 4:
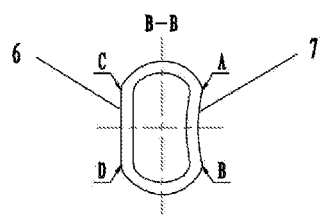
FIG. 4(a) is a cross section view taking along line B-B of a spring contact according to embodiment 2 according to present invention.
FIG. 4(b) is a scheme showing a contact mode between a first conductor or a second conductor and a spring contact according to embodiment 2 of the present invention.
FIG. 4(c) is a scheme showing another kind of contact mode between a first conductor or a second conductor and a spring contact according to embodiment 2 of the present invention.
Figure 4:
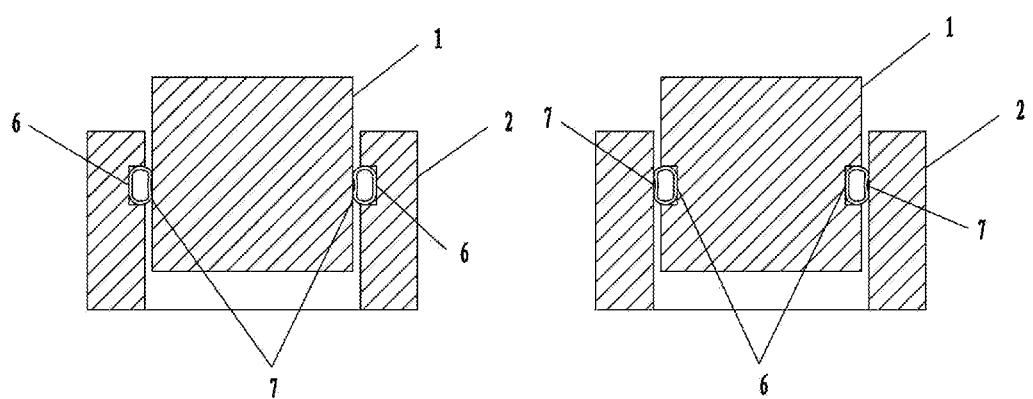

Referring to FIGS. 4(*a*)-4(*c*), they show embodiment 2 of present invention from various aspects. Referring FIG. 4(*a*), it can be seen that in a cross section 3 of a spring contact, there are two contacting side edges contacting with conductors, namely, a contacting side edge 6 which is a straight line, and a contacting side edge 7 which is an inner arc. Referring to FIG. 4(*b*), it can be seen that the spring contact 3 contacts with a conductor 1 via the contacting side edge 7, obtaining two-point contact, namely, point A and point B. A rectangle groove is selected to be used in conductor 2, with the contacting side edge 6 of the spring contact 3 contacting with the conductor 2 at a contacting line. And the contacting point thereof are point C and point D. Therefore, electrical current flows from A to C, from B to D, obtaining bidirectional circulating. Referring to 4(*c*), a rectangle groove is selected to be used in conductor 1, with the contacting side edge 6 contacting with the conductor 1 at a contacting line. And the contacting point thereof are point C and point D. The contacting side edge 7 contacts with the conductor 2 at point A and point B. Therefore, electrical current flows from A to C, from B to D, obtaining bidirectional circulating.

Figure 5:
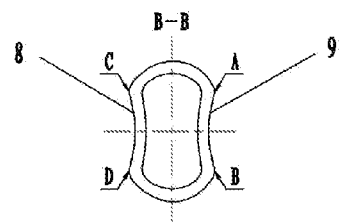
FIG. 5(a) is a cross section view taking along line B-B of a spring contact according to embodiment 3 of the present invention.
FIG. 5(b) is a scheme showing a contact mode between a first conductor or a second conductor and a spring contact according to embodiment 3 of the present invention.
FIG. 5(c) is a scheme showing another kind of contact mode between a first conductor or a second conductor and a spring contact according to embodiment 3 of the present invention.
Figure 5:
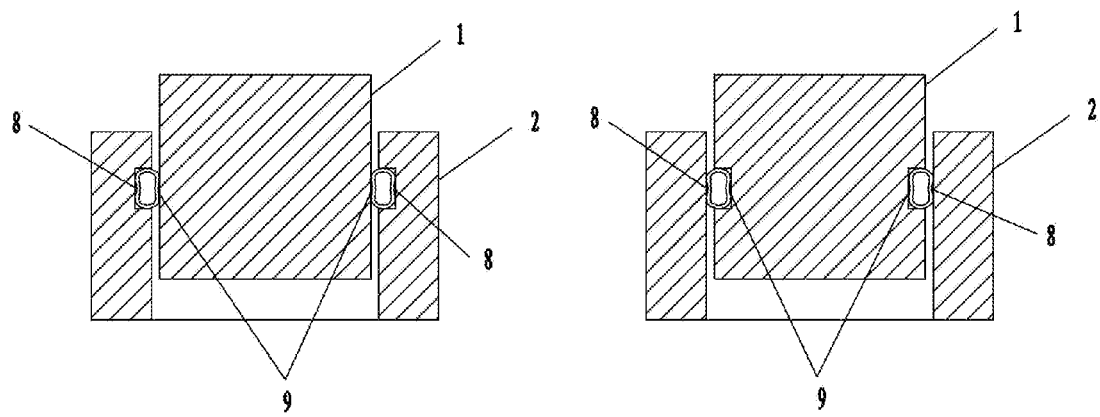

Referring to FIGS. 5(*a*)-5(*c*), they show embodiment 3 of present invention from various aspects. Referring FIG. 5(*a*), it can be seen that in a cross section 3 of a spring contact, there are two contacting side edges contacting with conductors, namely, a contacting side edge 8, and a contacting side edge 9, which are both inner arcs. Referring to FIG. 5(*b*), it can be seen that the spring contact 3 contacts with a conductor 1 via the contacting side edge 9, obtaining two-point contact, namely, point A and point B. A rectangle groove is selected to be used in a conductor 2, with the contacting side edge 8 of the spring contact 3 contacting with the conductor 2 at point C and point D. Therefore, electrical current flows from A to C, from B to D, obtaining bidirectional circulating. Referring to 5(*c*), a rectangle groove is selected to be used in a conductor 1, with the contacting side edge 9 contacting with the conductor 1 at point A and point B. The contacting side edge 8 contacts with the conductor 2 at point C and point D. Therefore, electrical current flows from A to C, from B to D, obtaining bidirectional circulating.

Figure 6:
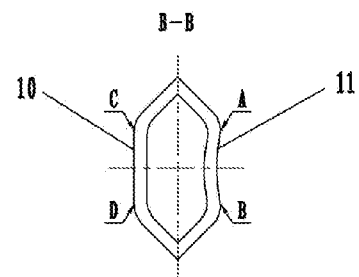
FIG. 6(a) is a cross section view taking along line B-B of a spring contact according to embodiment 4 of the present invention.
FIG. 6(b) is a scheme showing a contact mode between a first conductor or a second conductor and a spring contact according to embodiment 4 of the present invention.
FIG. 6(c) is a scheme showing another kind of contact mode between a first conductor or a second conductor and a spring contact according to embodiment 4 of the present invention.
Figure 6:
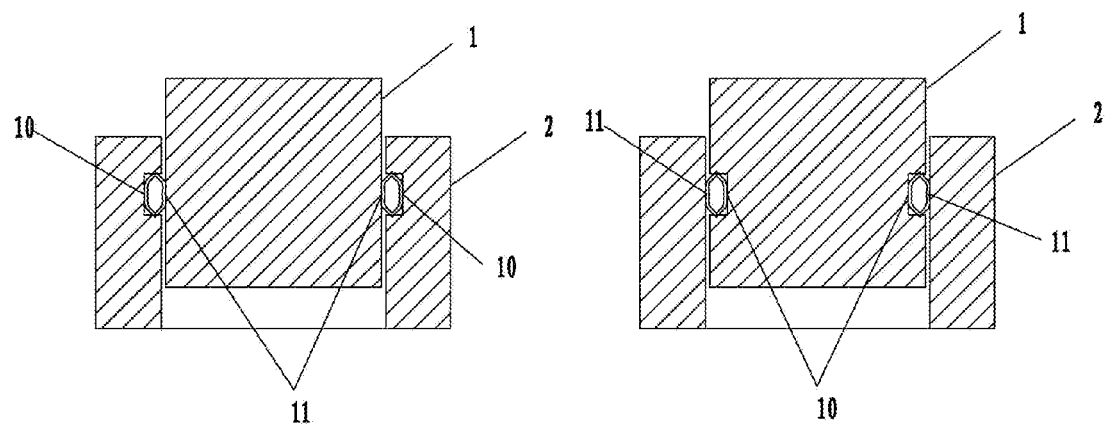

Referring to FIGS. 6(*a*)-(*c*), they show embodiment 4 of present invention from various aspects. Referring FIG. 6(*a*), it can be seen that in a cross section 3 of a spring contact, there are two contacting side edges contacting with conductors, namely, a contacting side edge 10 which is a straight line, and a contacting side edge 11 which is an inner arc. Referring to FIG. 6(*b*), it can be seen that the spring contact 3 contacts with a conductor 1 via contacting side edge 11, obtaining two-point contact, namely, point A and point B. A grooved rectangle groove is selected to be used in a conductor 2, with the contacting side edge 10 of the spring contact 3 line-contacting with the conductor 2. Therefore, electrical current flows from A to C, from B to D, obtaining bidirectional circulating. Referring to 6(*c*), a grooved rectangle groove is selected to be used in a conductor 1. With the contacting side edge 10 line-contacting with the conductor 1, the contacting side edge 11 of the spring contact 3 contacting with the conductor 2 at point A and point B. Therefore, electrical current flows from A to C, from B to D, obtaining bidirectional circulating. Top side and bottom side of the notched rectangle groove each is provided with a notch. In cross section of the spring contact, the two sides which do not contact with the conductors are shaped into folded lines, which fitting with the shapes of the notches, so as to secure the fixation of spring contact 3.

Figure 7:
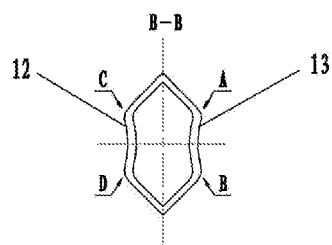
FIG. 7(a) is a cross section view taking along line B-B of a spring contact according to embodiment 5 of the present invention.
FIG. 7(b) is a scheme showing a contact mode between a first conductor or a second conductor and a spring contact according to embodiment 5 of the present invention.
FIG. 7(c) is a scheme showing another kind of contact mode between a first conductor or a second conductor and a spring contact according to embodiment 5 of the present invention.
Figure 7:
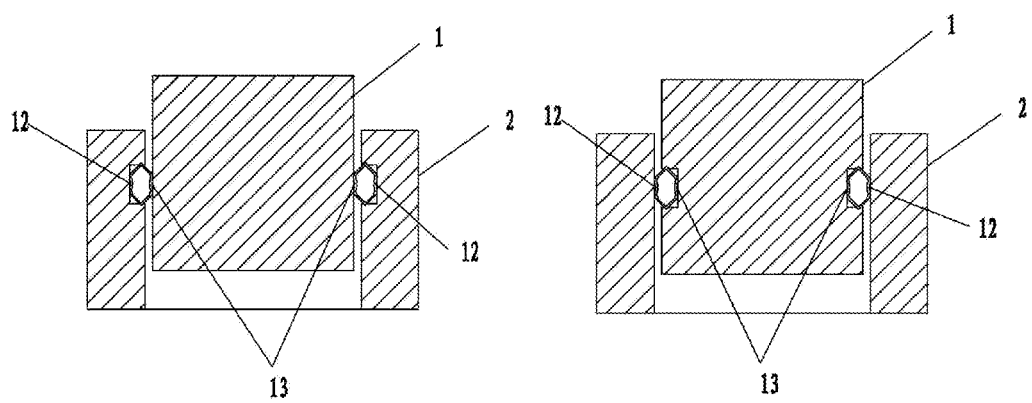

Referring to FIGS. 7(*a*)-(*c*), they show embodiment 5 of present invention from various aspects. Referring FIG. 7(*a*), it can be seen that in a cross section 3 of a spring contact, there are two contacting side edges contacting with conductors, namely, a contacting side edge 12, and a contacting side edge 13, which are both inner arcs. Referring to FIG. 7(*b*), it can be seen that the spring contact 3 contacts with a conductor 1 via a contacting side edge 13, obtaining two-point contact, namely, point A and point B. A notched rectangle groove is selected to be used in a conductor 2, with the contacting side edge 12 of the spring contact 3 contacting with the conductor 2 at point C and point D. Therefore, electrical current flows from A to C, from B to D, obtaining bidirectional circulating. Referring to 7(*c*), a rectangle groove is selected to be used in a conductor 1, with the contacting side edge 13 of the contacting with the conductor 1 at point A and point B. The contacting side edge 12 contacts with the conductor 2 at point C and point D. Therefore, electrical current flows from A to C, from B to D, obtaining bidirectional circulating.

Figure 8:
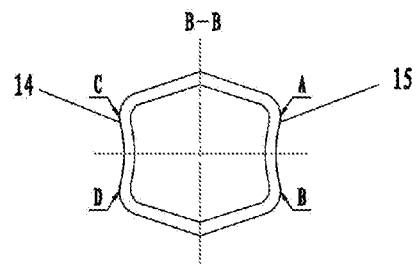
FIG. 8(a) is a cross section view taking along line B-B of a spring contact according to embodiment 6 of the present invention.
FIG. 8(b) is a scheme showing a contact mode between a first conductor or a second conductor and a spring contact according to embodiment 6 of the present invention.
FIG. 8(c) is a scheme showing another kind of contact mode between a first conductor or a second conductor and a spring contact according to embodiment 6 of the present invention.
Figure 8:
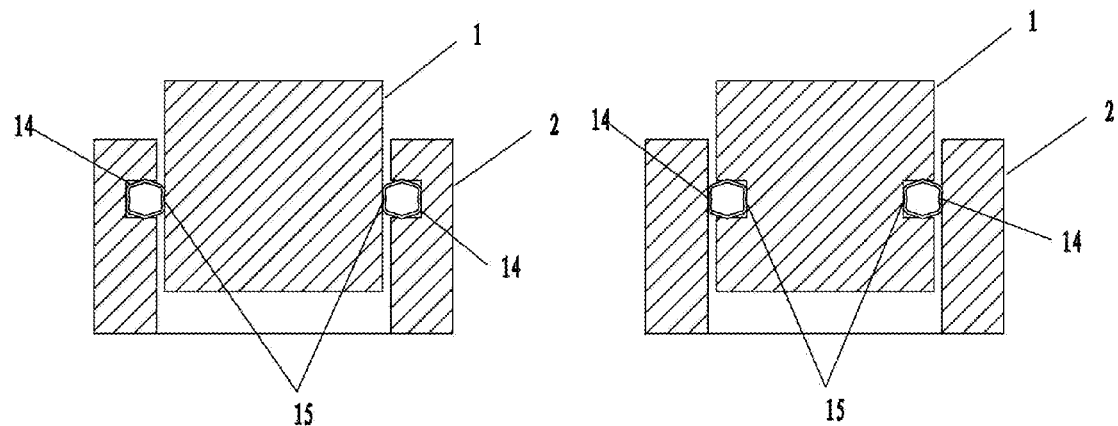

Referring to FIGS. 8(*a*)-(*c*), they show embodiment 6 of present invention from various aspects. Referring FIG. 8(*a*), it can be seen that in a cross section 3 of a spring contact, there are two contacting side edges contacting with conductors, namely, contacting side edges 14 and 15 which are both inner arcs. Referring to FIG. 8(*b*), it can be seen that the spring contact 3 contacts with a conductor 1 via a contacting side edge 15, obtaining two-point contact, namely, point A and point B. A rectangular groove, here likes a square, which is adapted to the cross section, is selected to be used in a conductor 2, with the contacting side edge 14 of the spring contact 3 contacting with the conductor 2 at point C and point D. Therefore, electrical current flows from A to C, from B to D, obtaining bidirectional circulating. Referring to 8(*c*), a rectangular groove is selected to be used in a conductor 1, with the contacting side edge 15 contacting with the conductor 1 at point A and point B. And the contacting side edge 14 contacts with the conductor 2 at point C and point D. Therefore, electrical current flows from A to C, from B to D, obtaining bidirectional circulating.

Figure 9:
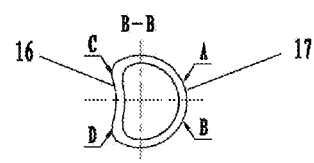
FIG. 9(a) is a cross section view taking along line B-B of a spring contact according to embodiment 7 of the present invention.
FIG. 9(b) is a scheme showing a contact mode between a first conductor or a second conductor and a spring contact according to embodiment 7 of the present invention.
FIG. 9(c) is a scheme showing a second kind of contact mode between a first conductor or a second conductor and a spring contact according to embodiment 7 of the present invention.
FIG. 9(d) is a scheme showing a third kind of contact mode between a first conductor or a second conductor and a spring contact according to embodiment 7 of the present invention.
FIG. 9(e) is a scheme showing a forth kind of contact mode between a first conductor or a second conductor and a spring contact according to embodiment 7 of the present invention.
FIG. 9(f) is a scheme showing a fifth kind of contact mode between a first conductor or a second conductor and a spring contact according to embodiment 7 of the present invention.
FIG. 9(g) is a scheme showing a sixth kind of contact mode between a first conductor or a second conductor and a spring contact according to embodiment 7 of the present invention.
Figure 9:
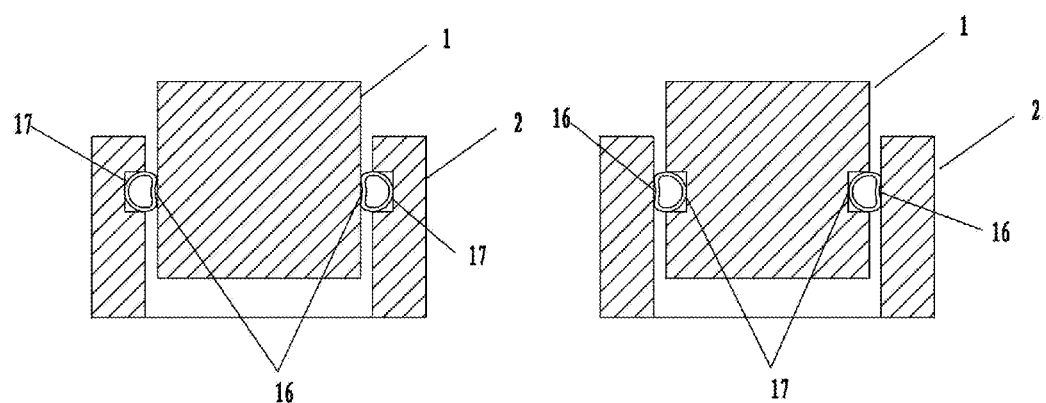

Referring to FIGS. 9(*a*)-(*g*), they show embodiment 7 of present invention from various aspects. Referring FIG. 9(*a*), it can be seen that in a cross section 3 of a spring contact, there are two contacting side edges contacting with conductors, namely, a contacting side edge 16 which is an inner arc, and a contacting side edge 17 which is a outer arc. Referring to FIG. 9(*b*), it can be seen that the spring contact 3 contact with a conductor 1 via the contacting side edge 16, obtaining two-point contact, namely, point C and point D. A rectangular groove is selected to be used in a conductor 2, with the contacting side edge 17 of the spring contact 3 contacting with the conductor 2 at point A and point B. Therefore, electrical current flows from A to C, from B to D, obtaining bidirectional circulating. Referring to 9(*c*), a rectangular groove is selected to be used in a conductor 1, while the contacting side edge 17 contacting with the conductor 1 at point A and point B, and the contacting side edge 16 contacting with the conductor 2 at point C and point D. Therefore, electrical current flows from A to C, from B to D, obtaining bidirectional circulating. Referring to FIGS. 9(d) to 9(g), grooves having the shape of right trapezoid and trapezoid are selected to be used respectively on the conductor land conductor 2, with the two contacting side edges both contacting with the conductors at two points. Therefore, they both can obtain bidirectional circulating, with electrical current flowing from A to C, from B to D. By adapting the same cross section with grooves having various shapes, various assembling ways can be obtained, so as to provide various assembling embodiments.

The contacting side edges of the spring contact according present invention can take the form of a folded line shape or a wave shape, which can provide more contacting points, between the spring contacting finger and the conductors. Generally, contacting points are among 2-4. The other two sides which do not contact with the conductors, can also take the form of various shapes, such as circular, straight line, folded line and so on.

The spring contact according to the present invention can be adapted to sliding connecting, statistic connecting and plug-in connecting as well. The spring contact according to the present invention provides four contacting points at each ring. And compared with prior spring contact which provides a single circulating path, the spring contact according to the present invention provides two shorter circulating path with the same over-current area, as a result, provides for a duplicated current passing capacity, and decreased cross section area of each ring. Therefore, the spring contact of the present invention can be applied in more widely fields.

Other embodiments and variations of this subject matter can be devised by others skilled in the art without departing from the true spirit and scope of the subject matter. The appended claims include all such embodiments and equivalent variations.

The invention claimed is:

1. A spring contact for conducting electricity, which is characterized in that:
   the spring contact for conductive electicity is configured as a coil spring having a plurality of rings arranged relative to each other in a circumferential array extending around an axis to form an annular body;
   among two contacting side edges for conducting electricity at a cross section of each of the plurality of rings of the coil spring, wherein
   one of the contacting side edges for conducting electricity has two or more contacting points and includes at least an inner arc shape at the cross section, while the other contacting side edge for conducting electricity has at least one contacting point, or contacting line.

2. The spring contact according to claim 1, wherein:
   one of the contacting side edges for conducting electricity at a cross section of each ring of the coil spring has two or three contacting points, and the other contacting side edge for conducting electricity has one or two contacting points.

3. The spring contact according to claim 1, wherein:
   the contacting side edges for conducting electricity at the cross section include arc, folded line or wave line shapes.

4. The spring contact according to claim 1, wherein:
   the other of the contacting side edges for conducting electricity at the cross section is of inner arc, outer arc or line shapes.

5. The spring contact according to claim 2, wherein:
   the contacting side edges for conducting electricity at the cross section include arc, folded line or wave line shapes.

6. The spring contact according to claim 2, wherein:
   the other of the contacting side edges for conducting electricity at the cross section is of inner arc, outer arc or line shapes.

7. A connector including a spring contact for conducting electricity, which comprises
   a first conductor,
   a second conductor,
   a spring contact for electrically connecting the first conductor and the second conductor and being positioned in a groove in the first conductor or the second conductor, which is characterized in that:
   the spring contact for conducting electricity is configured as a coil spring having a plurality of rings arranged relative to each other in a circumferential array extending around an axis to form an annular body;
   among two side edges for conducting electricity at a cross section of each of the plurality of rings of the coil spring, wherein
   one of the contacting side edges for conducting electricity has two or more contacting points and includes at least an inner arc shape at the cross section, while the other contacting side edge for conducting electricity has at least one contacting point, or contacting line.

8. A connector according to claim 7, wherein:
   the groove is of rectangle, right trapezoid, trapezoid, semi-hexagonal or notched rectangle shapes.

9. A connector according to claim 7, wherein the contacting side edges for conducting electricity at the cross section include arc, folded line or wave line shapes.

10. A connector according to claim 7, wherein the other of the contacting side edges for conducting electricity is of inner arc, outer arc or line shapes.

11. A connector according to claim 8, wherein the contacting side edges for conducting electricity at the cross section include arc, folded line or wave line shapes.

12. A connector according to claim 8, wherein the other of the contacting side edges for conducting electricity at the cross section is of inner arc, outer arc or line shapes.

* * * * *